INVENTOR.
ELBRIDGE W. THRASHER
BY
Eckhoff and Hoppe
ATTORNEYS

United States Patent Office

3,516,460
Patented June 23, 1970

3,516,460
MOUNTING FOR GUIDED CIRCULAR SAWS
Elbridge W. Thrasher, Ukiah, Calif., assignor to Masonite Corporation, a corporation of Delaware
Filed Mar. 27, 1968, Ser. No. 716,528
Int. Cl. B27b 5/30
U.S. Cl. 143—155                                    4 Claims

ABSTRACT OF THE DISCLOSURE

A mounting for guided circular saws comprising an arbor having a plurality of splines arranged in a symmetrical pattern and one or more circular saws, each saw being formed with a central opening including a plurality of recesses complementary to the periphery of said arbor and adapted for receiving the arbor therethrough with axial floating looseness.

---

This invention relates generally to apparatus for guiding saws and more particularly involves an improved means for mounting circular saws upon an arbor in a manner that will allow the saws to move axially thereon with floating looseness. The invention has particular relation to my earlier invention of U.S. Pat. No. 3,285,-302 in which saw guides are utilized for controlling the cutting action of unusually thin saw blades. Apparatus of this type, it has been found, may be used to obtain a larger recovery of usable lumber than is otherwise possible with more conventional apparatus.

The present invention is particularly concerned with the problem of mounting circular saws upon an arbor to provide axial floating looseness but yet having a positive drive connection with its supporting arbor that is capable of withstanding the shear forces normally experienced during cutting. Although this problem has previously been solved by the use of large diameter and relatively wide saw collars mounted to the saw blades, such devices have certain disadvantages. In particular, the use of saw collars imposes a limitation on the depth of cut which may be made with a given saw, and saw collars are expensive both with respect to their initial cost as well as with regard to time and labor required in affixing them to saws.

This invention provides a structural solution to the problem which obviates the need for conventional use of saw collars, thereby allowing greater depth of saw to be used to the end that smaller diameter saws can be used for cutting lumber of a given thickness.

One object of this invention is to provide a mounting for guided circular saws that will obviate the need for saw collars.

Another object is to provide a mounting of the kind described that allows smaller diameter saws to be used for cutting lumber of a particular thickness as compared with saws required for cutting the same thickness when saw collars are used.

A still further object of the invention is to provide a mounting for guided circular saws of the kind described and further having the characteristic of being self-centering upon its arbor.

Another object is to provide a mounting of the kind described which has all of the recited advantages and which, further, allows a guided saw to be moved with axial floating looseness.

Various other objects of this invention will become apparent in view of the following detailed description and the accompanying drawing.

Figure 1:
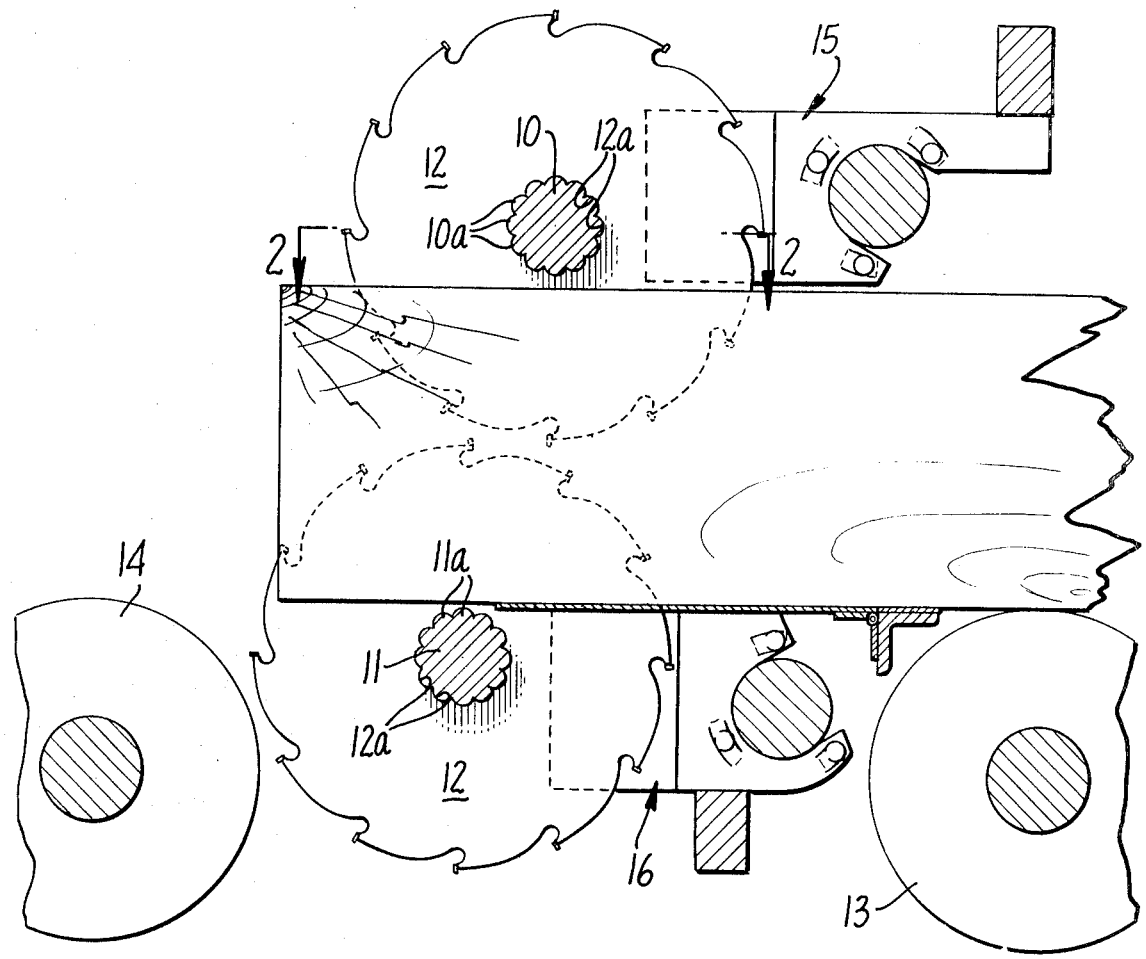
Figure 2:
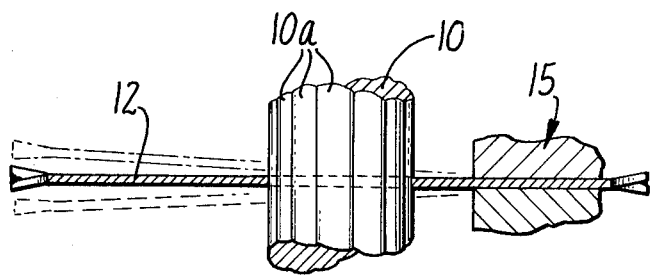

In the drawing forming a part of this application and in which like parts are identified by like reference numerals throughout the same, FIG. 1 is an elevation and partial vertical section taken through a double arbor battery edger including saw guiding apparatus and having a plurality of circular saws mounted upon each arbor in a preferred manner contemplated by this invention; and FIG. 2 is an enlarged section taken on lines 2—2 of FIG. 1 and showing by broken lines alternate positions of the circular saw when in use.

In FIG. 1 there is shown a double arbor battery edger comprised of upper and lower arbors 10 and 11, each arbor supporting a plurality of circular saws 12. A pair of rollers 13 and 14 form a part of conventional apparatus for moving cants or flitches into the battery of saws 12 and conveying the cut lumber through and past the blades. Upper and lower saw guides 15 and 16, respectively, engage the leading side of the blades 12 with a plane of peripheral contacts on each side and including points of contact near the gullet line of each saw blade. Such saw guides operate in essentially the same manner described in U.S. Pat. No. 3,285,302.

This invention is more particularly directed to the manner by which saw blades 12 are formed with a scalloped opening 12a which allows them to be mounted upon arbors 10 and 11 without using saw collars. The invention is based on a discovery that circular saws may be mounted to an arbor without the use of saw collars when guided at the peripheral leading edge and mounted upon the arbor with a floating looseness. However, the connection between saws and arbors must be such that the saws cannot be readily sheared from the arbor and that each saw will remain centered upon the arbor during use. These conditions may be fulfilled, it has been found, by providing an arbor having a plurality of splines arranged circumferentially in a symmetrical pattern, and preferably with uniform spacing therebetween. Such splines are indicated by the reference numbers and letters 10a and 11a on arbors 10 and 11, respectively.

A sufficint number of splines must be used to withstand the shear forces which may be expected during use of the saws. In addition, each spline should be formed having a sloped surface relative to a diameter through the geometric center of the spline. This type of surface may be provided either by a rounded spline, as shown, or by linear tooth-like surfaces. A sloped surface tends to center the saw upon the arbor by virtue of the symmetrical contacts which the opening in the saw makes with the sloped surfaces of each spline.

In operation, it will be apparent that each spline engages a recess formed in the opening of the saw and because each spline makes a contact on a surface that is sloped relative to a diameter through its geometric center, it tends to move the saw radially outward by a camming action. However, since there is a symmetrical arrangement of splines and recesses, the saw will, rather, center itself upon the arbor.

Although a preferred embodiment of the invention has been illustrated and described, various modifications and changes may be made without departing from the spirit of the invention, and each of such changes and modifications is contemplated.

What is claimed is:

1. In combination with saw guiding apparatus for engaging a saw proximate to its gullet line, an improvement in mounting a circular saw upon an arbor for lateral movement thereon, comprising: an arbor formed with a plurality of splines arranged circumferentially in a symmetrical pattern, each spline having a sloped surface relative to a diameter through the geometric center of said spline; and a circular saw formed with a central opening including a plurality of recesses complementary to the periphery of said arbor, the opening of each saw being of a size greater than the periphery of said arbor to receive said arbor therethrough with axial floating looseness, the shape of each recess providing a contact with a spline for aligning the saw with respect to the axis of arbor rotation; whereby each saw is centered upon the arbor by contacts between the sloped surfaces of said splines.

2. The combination of claim 1, said arbor having a plurality of splines further arranged in a symmetrical pattern of uniform spacing.

3. The combination of claim 1, each saw opening being defined by a scalloped edge formed by a symmetrical pattern of circular recesses.

4. An improved method for keying a plurality of circular saws upon an arbor for use in a battery edger having apparatus for guiding said saws with points of contact near the gullet line of each saw, comprising the steps: forming an arbor with a plurality of splines arranged circumferentially of said arbor in a symmetrical pattern of uniform spacing, each spline having a sloped surface relative to a diameter through the geometric center of said spline, and forming a central opening including a plurality of recesses complementary to the periphery of said splined arbor, each opening being of a size greater than the splined periphery of said arbor to allow axial movement of each saw along said arbor when in use, the shape of each recess providing a contact with a spline for aligning the saw with respect to the axis of arbor rotation.

References Cited

UNITED STATES PATENTS

| 2,912,021 | 1959 | Gommel | 143—155 X |
| 3,285,302 | 1966 | Thrasher | 143—37 |

FOREIGN PATENTS 495,319    1929    Germany.

ANDREW R. JUHASZ, Primary Examiner

J. F. COAN, Assistant Examiner

U.S. Cl. X.R.
83—665; 143—37